United States Patent
Geeroms

(10) Patent No.: US 6,964,703 B2
(45) Date of Patent: Nov. 15, 2005

(54) STARCH-BASED GLUE PASTE COMPOSITIONS

(75) Inventor: Johan Geeroms, Hofstade (BE)

(73) Assignee: Remy Industries N.V., (BE)

( * ) Notice: Subject to any disclaimer, the term of this patent is extended or adjusted under 35 U.S.C. 154(b) by 4 days.

(21) Appl. No.: 10/507,036

(22) PCT Filed: Apr. 7, 2003

(86) PCT No.: PCT/EP03/03587

§ 371 (c)(1),
(2), (4) Date: Sep. 8, 2004

(87) PCT Pub. No.: WO03/087253

PCT Pub. Date: Oct. 23, 2003

(65) Prior Publication Data

US 2005/0163974 A1     Jul. 28, 2005

(30) Foreign Application Priority Data

Apr. 12, 2002 (EP) .................................. 02008430

(51) Int. Cl.[7] ...................... C09J 103/02; C09J 103/06
(52) U.S. Cl. ............................... 106/211.1; 106/207.3; 156/205; 156/210; 428/182
(58) Field of Search .......................... 106/207.3, 211.1; 156/205, 210; 428/182

(56) References Cited

U.S. PATENT DOCUMENTS 5,641,349 A * 6/1997 Koubek et al. .......... 106/206.1

FOREIGN PATENT DOCUMENTS

| FR | 597 747 | 11/1925 | |
|---|---|---|---|
| GB | 415 611 | 8/1934 | |
| JP | 9-235529 | 9/1997 | .......... C09J 103/02 |
| JP | 2001 164213 | 6/2001 | .......... C09J 103/02 |

OTHER PUBLICATIONS

Kuhl, Hugo: "Methods for increasing the adhesiveness of starch paste" Chemical Abstracts, vol. 36, No. 21, Nov. 10, 1942, Columbus, Ohio, u.S.A. (Abstract No. 6836).

* cited by examiner

Primary Examiner—David Brunsman
(74) Attorney, Agent, or Firm—Hayes Soloway P.C.

(57) ABSTRACT

Novel starch-based glue paste compositions are disclosed composed of (i) a carrier paste containing 5 to 16 wt % of a starch selected from the group consisting of corn starch, wheat starch, rye starch, oat starch, barley starch, potato starch, tapioca starch and pea starch, each being native starch or chemically modified starch, or any mixture thereof and (ii) a main paste with a total starch content of 25 to 50 wt % composed of a mixture of 10 to 30 wt % native rice starch or an acetylated version thereof having an amylose content of 12 to 20 wt %, 1 wt % other compounds and a complementary amylopectin content of 87 to 79 wt %, and 90 to 70 wt % of a starch or mixture of starches selected from the above defined group. Processes for the manufacture of the novel glue paste compositions based on the Stein-Hall method are disclosed, as well as a premix of starches for said manufacture. The glue paste compositions present excellent film forming and glueing properties and are particularly suitable for the manufacture of laminated corrugated board.

19 Claims, 1 Drawing Sheet

Fig. 1: THICKENING RHEOGRAM OF GLUE PASTE COMPOSITION
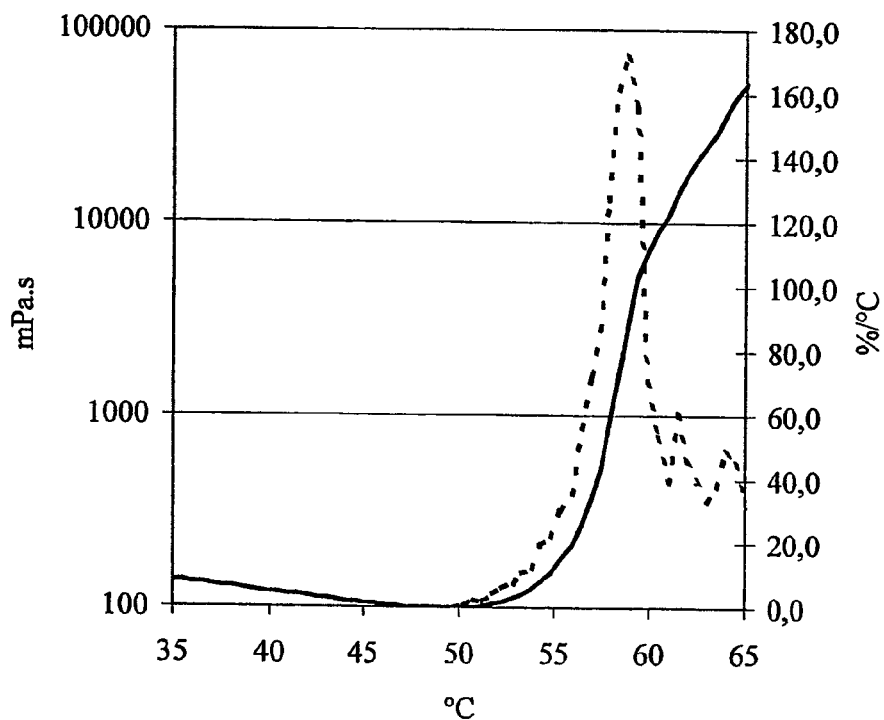
Legend:
full line: viscosity (mPa.s);
dotted line: thickening speed (% viscosity increase per temperature increase in °C)
Glue composition:
native wheat starch / 82 % native wheat starch + 18 % native rice starch (at 18 % amylose);
ratio secondary paste : primary paste 2.5 : 1

STARCH-BASED GLUE PASTE COMPOSITIONS

This application is a 371 of PCT/EP03/03587, filed 7 Apr. 2003.

FIELD OF THE INVENTION

The present invention relates to starch-based glue paste compositions and intermediates for it, to their manufacture, to the use of the compositions for the manufacture of laminated corrugated board and to laminated corrugated board.

BACKGROUND AND STATE OF THE ART

Already for long times various product surfaces have been connected by means of glues. Typical surfaces which are joined together at industrial scale by means of glues include paper and cardboard surfaces. To this end glue paste compositions prepared from starch are widely used because of the ease of their preparation, their technical properties and their availability at economically acceptable costs. Starches from various sources have already been used. Glue paste compositions are commonly prepared from corn starch, wheat starch, potato starch or tapioca starch. The term corn hereinafter always refers to maize.

A particular kind of cardboard which is widely used for various applications is laminated corrugated board, consisting of a cardboard core material having permanent corrugations with an adherent liner on one or on both sides. The liner is commonly a sheet of flat board or paper. The core corrugated material is joined to the adherent liner(s) by means of a glue that is applied to the tops of the corrugates on the upper side and/or the underside of the core material, followed by bringing these tops in contact with the liner(s) and applying pressure and heat.

The manufacture of laminated corrugated board is particularly demanding for the glue because the glue has to be easy to process and has to ensure that during the manufacturing of the laminate the surfaces of the corrugated core and the liner are rapidly glued together with a good initial bond, that the final connection presents good adhesive strength and that possible deformation of the liner caused by the glueing process is minimal.

For the manufacture of laminated corrugated board, mainly glue paste compositions based either on corn starch or on wheat starch are used because these glues ensure good adhesive strength and the source materials are amply available at economically acceptable costs.

Conventionally these glue paste compositions are prepared according to the Stein-Hall method.

Typical for the Stein-Hall method is that the glue composition contains two different parts. The difference results from the fact that the glue composition is composed of a carrier paste (also termed primary paste) and a main paste (also termed secondary paste) the preparations of which are significantly different from each other, as follows from the description below.

The carrier paste is conventionally prepared by mixing the starch in powder form in water warmed up at about 30 to 50° C., with subsequent addition under stirring of a certain amount of sodium hydroxide usually in the form of a concentrated aqueous solution. The mixture is kept for a while at about 30 to 50° C. under vigorous stirring with shearing till a stable viscosity of the mixture is obtained (typically about 15 to 30 minutes), thus forming the carrier paste. The concentration of the starch in the mixture typically ranges from 6 to 16 wt % and the weight ratio sodium hydroxide: starch is commonly ranging from 1:10 to 1:4.

During the preparation process, the starch in the carrier paste becomes fully gellified. Said gellified starch can absorb/bind up to about 20 gram water per gram starch, which is much more than non-gellified starch can do. Non-gellified starch can absorb/bind only about 1 gram water per gram starch.

The main paste is conventionally prepared by stirring the starch in powder form into water at or below room temperature and adding under stirring a certain amount of borax to the mixture. The mixture is stirred for about 10 to 30 minutes, thus yielding the main paste. The concentration of the starch in the mixture ranges from about 18 to 35 wt % and the weight ratio starch: borax commonly ranges from 50:1 to 100:1. Because this mixture is much more concentrated in starch, is containing much less alkali base (borax) based on the starch content than the carrier paste, and is prepared at about or below room temperature, the starch of the main paste does not undergo gellification. As a result thereof, the starch of the main paste is non-gellified starch that can absorb/bind only a small amount of water, about 1 gram water per gram starch.

The glue paste composition is then obtained by mixing the carrier paste with the main paste at a selected weight ratio main paste:carrier paste, which typically ranges from 1:1 to 5:1.

There exist some variants of the glue preparation according to the Stein-Hall method. Following one variant, typically used at industrial scale, the preparation of the glue paste composition is carried out in one reactor (one pot process), involving the subsequent steps of loading the required amount of water, warming it up to about 30 to 50° C., adding the required amount of starch for the carrier paste in powder form under vigorous stirring, adding the appropriate amount of caustic soda solution and stirring the mixture with shearing at about 30 to 50° C. for about 15 to 30 minutes. Accordingly, water at or below room temperature is added under stirring in the required amount for the main paste, followed by the required amount of starch for the main paste in powder form. Then the appropriate amount of borax is added and the mixture is stirred for about 10 to 30 minutes, typically for about 15 minutes, at ambient temperature, thus forming the desired glue paste composition.

As a result of the addition of the amount of water at or below room temperature required for forming the main paste, the temperature of the total mixture and the concentration of the caustic soda in the total mixture are reduced to such a level that the starch added to form the main paste does not become gellified at all or becomes gellified to only a non-significant extent, typically less than 1 wt %, which is considered herein as essentially non-gellified.

According to another variant, also used at industrial scale, the glue paste is prepared by an in-line manufacturing process.

Some glue paste compositions for the manufacture of laminated corrugated board have been disclosed which are based on certain combinations of starches from different plant sources, namely in JP 9-235529 and JP 2001-164213.

JP 9-235529 (Rengo Co Ltd) describes glue pastes which are a mixture of a paste from corn starch and a paste from tapioca starch at a solid content ratio corn starch: tapioca starch of 10:90 to 70:30. The pastes are prepared separately from corn starch and tapioca starch, respectively, water, an aqueous solution of caustic soda and boric acid. In these pastes the weight ratio total water to total starch is 3.00, the total starch concentration is 24.7 wt %, the caustic soda concentration (calculated on the paste) is 0.60 wt % and the content of borax (calculated on the starch content) is 2.00 wt %.

JP 2001-164213 (Tokan Kogyo Co Ltd) describes glue paste compositions for laminating corrugated board prepared from of a mixture of corn starch and rice starch. According to the manufacturing process described by JP 2001-164213, which is based on the Stein-Hall method, a carrier paste and a main paste are prepared separately and subsequently both pastes are mixed to form the glue paste composition. Table 5 of JP 2001-164213 specifically discloses the preparation of a glue paste composition wherein (i) the carrier paste contains a weight ratio corn starch: rice starch of 1:1, a total starch content of 8.6 wt % and a weight ratio total water: total starch of 10.4:1, and (ii) the main paste contains a weight ratio corn starch: rice starch of 4:1, a total starch content of 31.76 wt % and a weight ratio total water: total starch of 2.13:1. Various glue paste compositions are obtained by mixing the carrier paste and the main paste in different weight ratio's.

JP 2001-164213 furthermore stipulates that in order to have the glueing paste presenting good glueing properties, the rice starch has to be present in the carrier starch paste as well as in the main starch paste, and the rice starch has to be present in the glueing paste (being the mixture of the carrier paste and the main paste) in a total concentration ranging from 5 to 30 wt % of the solid moiety of the glue paste.

JP 2001-164213 also discloses as a further characteristic of the invention that the start temperature of the gellification of the glue paste is significantly reduced compared to conventional starch-based glue pastes. As a result thereof the initial glueing is improved and the glueing during the laminating process can be carried out at lower temperatures than the ones used for conventional starch-based glue compositions. JP 2001-164213 relates these properties to the presence in the carrier paste and in the main paste of rice starch which is known to present a lower temperature of gellification and a higher rate of moisture evaporation than starch from corn, wheat, potato and tapioca.

JP 2001-164213 discloses in paragraph 0023 that the presence of rice starch in the carrier paste is of particular importance because it is considered as an important factor to obtain good initial glueing power at reduced glueing temperatures, whereas the effect of rice starch in the main paste appears to be not very large.

The quantity of glueing paste according to JP 2001-164213 that has to be applied to obtain good glueing properties can be reduced by 20% compared to conventional starch-based glue compositions, namely from conventionally about 10 g/m$^2$ down to 8 g/m$^2$.

Furthermore, said reduction in temperature during the initial phase of the laminating process and in amount of glue paste that has to be applied, results in less deformation of the board or paper sheet that is lining the corrugated board core.

Depending from the variety of the rice and the manufacturing process of the rice starch, several types of rice starch are produced, which significantly differ in composition. However, JP 2001-164213 is silent about the type of rice starch used as well as about the effect of the type of rice starch on the physico-chemical properties of the glue paste composition and on its glueing properties.

Although various glue compositions have been disclosed so far and several glue paste compositions for the manufacture of laminated corrugated board are commercially available, these compositions commonly present, apart from desirable properties, mostly one or more disadvantages, such as for example, poor viscosity stability of the glue paste, insufficient glueing strength when applied in small amounts, need of high temperatures to obtain good initial glueing, high water content which leads to high energy requirements (high temperature and/or long heating periods) for evaporating the water during the laminating and glueing step, considerable deformation of the liners, and/or poor manufacturing speed in the laminating/glueing step. Accordingly, industry is continuously in search of new glue compositions for the manufacture of laminated corrugated board, which present improved properties and/or less drawbacks compared to known glue compositions.

BRIEF DESCRIPTION OF THE DRAWING

FIG. 1 is a thickening rheogram of the product of example 2.

DESCRIPTION OF THE INVENTION

In the search for alternative and/or improved glue compositions, the inventors have discovered new starch-based glue paste compositions for the manufacture of laminated corrugated board which unexpectedly present improved properties and/or less drawbacks compared to the glue compositions known in the art. These new compositions form the basis of the present invention.

In one aspect the present invention relates to a starch-based glue paste composition consisting of a mixture of a carrier paste (also named primary paste) and a main paste (also named secondary paste), wherein:

the carrier paste is a starch-based paste composed of cereal starch, tuber starch, pea starch, or any mixture thereof, typically of a starch selected from the group consisting of corn (maize) starch, wheat starch, rye starch, oat starch, barley starch, potato starch, tapioca starch and pea starch, each being native starch or chemically modified starch, or any mixture thereof, water and an alkali base, preferably sodium hydroxide, wherein the starch is present in a concentration ranging from 5 to 16 wt %, preferably from 6 to 10 wt %, based on the total amount of water in the carrier paste, and the alkali base is present in an amount ranging from 10 to 25 wt %, preferably from 15 to 25 wt %, calculated as sodium hydroxide (NaOH) and based on the amount (dry substance) of the starch in the carrier paste, the main paste is a starch-based paste composed of a mixture of (i) native rice starch, or an acetylated version thereof containing from 0.25 wt % to 2.5 wt % acetyl groups on dry starch content (hereinafter referred to as acetylated rice starch), and (ii) a cereal starch, tuber starch, pea starch, or any mixture thereof, typically a starch selected from the group consisting of corn (maize) starch, wheat starch, rye starch, oat starch, barley starch, potato starch, tapioca starch and pea starch, each being native starch or chemically modified starch, or any mixture thereof, water, and sodium borate, typically borax, wherein the native rice starch or acetylated version thereof is present in an amount ranging from 10 to 30 wt %, preferably from 15 to 25 wt %, typically from 15 to 19 wt %, on the total starch content (dry substance) of the main paste, the total amount of starches in the main paste ranges from 25 to 50 wt %, preferably from 35 to 45 wt % based on the total amount of the main paste, and sodium borate (calculated as anhydrous borax) is present in an amount ranging from 0.3 to 3 wt %, preferably from 0.5 to 2 wt %, based on the amount of the starch (dry substance) in the main paste, and the weight ratio main paste:carrier paste ranges from 1:1 to 3:1, preferably from 1.4:1 to 2:1.

The term alkali base herein refers to a base composed of a cation of an alkali metal and an anion being an hydroxyl anion or an anion derived from a weak organic or weak inorganic acid. The alkali base used in the preparation of the carrier paste is preferably a sodium base, typically sodium hydroxide, which is commonly used in the form of a concentrated aqueous solution, e.g. a caustic soda solution of 25 to 50 wt %. The alkali base used in the preparation of the main paste is sodium borate and can be used in the form of anhydrous borax, borax pentahydrate, borax decahydrate, and as an aqueous borax solution. These forms are all commercially available in various grades. Sodium borate may also be generated in situ by reaction of boric acid with sodium hydroxide in aqueous medium in the mixture forming the main paste.

Cereal starches including i.a. corn starch, wheat starch, rye starch, oat starch and barley starch, tuber starches including i.a. potato starch and tapioca starch, and pea starch, are well known in the art and are commercially available in various types and grades. Typical types include native starches and chemically modified starches, such as acetylated starches (starches containing from 0.25 wt % to 2.5 wt % acetyl groups on dry starch content), cross-linked starches with a low degree of cross-linking as for example obtained by reaction of the starch with 100 ppm to 700 ppm phosphorus oxytrichloride ($OPCl_3$), and starches presenting a combination of both chemical modifications. All these starches and any mixture thereof are suitable for the preparation of the starch-based glue paste composition according to the present invention.

The rice starch which is suitable for the preparation of the main paste according to the present invention has to be native rice starch which contains from 12 wt % to 20 wt % amylose, about 1 wt % other compounds, such as e.g. proteins, and a complementary 87 wt % to 79 wt % amylopectin. The acetylated version of the rice starch that is suitable for the present invention has to have a composition corresponding to the one of said suitable native rice starch. A preferred native rice starch contains from 16 wt % to 18 wt % amylose and a complementary 83 wt % to 81 wt % amylopectin. The most preferred native rice starch and acetylated version thereof contain about 18 wt % amylose. Such native rice starches and acetylated rice starches are commercially available, for example, as, respectively, Remy CB and Remygel 6-211 from REMY INDUSTRIES n.v., Belgium.

In a preferred embodiment the starch forming the carrier paste and the starch forming the main starch component of the main paste are of the same plant source and type. Typically preferred are native and chemically modified corn starch, wheat starch, rye starch, potato starch and tapioca starch. More preferably the starch of the carrier paste and the main starch component of the main paste is native corn starch, cross-linked corn starch, native wheat starch or cross-linked wheat starch, most preferably native or cross-linked wheat starch.

The starch-based glue paste composition of the invention may optionally contain at very low concentration adjuvants, for example biocides and/or water repellent agents, which are not affecting the glueing properties but which are commonly used in glue compositions for the manufacture of cardboard and laminated corrugated board articles, such as articles that are used for cooled storage of vegetables and fruit.

In a second aspect, the present invention relates to a method for the manufacture of the starch-based glue paste compositions defined herein before, which is based on the Stein-Hall method.

According to a first variant (named herein Variant A), a starch-based carrier paste and a starch-based main paste are separately prepared and subsequently mixed to yield the starch-based glue composition according to the present invention. The carrier paste and the main paste, as well as the mixture thereof can be prepared conventionally, for example as described below.

The carrier paste is prepared by mixing the starch defined above, preferably in powder form, into water of about 30° C. to 50° C. with subsequent addition under stirring of the alkali base, usually as a concentrated aqueous solution of sodium hydroxide. Stirring with high shear is applied at about 30° C. to 50° C., preferably at 40° C. to 45° C., commonly for about 15 to 40 minutes, till the starch is fully gellified and a mixture with a stable viscosity is obtained. The time the mixture is stirred to obtain complete gellification depends to a large extent on the plant source and the type of the starch. For example, native corn starch requires about 15 minutes and native rice starch about 30 minutes stirring at about 40° C.

The main paste is prepared by stirring the mixture of the rice starch or acetylated rice starch and a starch defined above, preferably in powder form, into water at or below room temperature and adding under stirring the required amount of sodium borate, typically borax, or an appropriate amount of boric acid and sodium hydroxide, to the mixture. Subsequently, the mixture is stirred till the yield of a homogeneous paste, which typically takes about 5 to 15 minutes. Variants are possible for the addition of the starches: the rice starch and the other starch or starches may be added in the form of a premix, as well as separately in any order. The order in which the starches are added to form the mixture of the main paste has essentially no effect on the quality and properties of the obtained paste.

The starch-based glue paste composition according to the invention is then obtained by mixing the appropriate amounts of carrier paste and main paste. Typically the main paste is added under stirring to the carrier paste and stirring is continued till an homogeneous paste is obtained, which typically requires about 10 to 30 minutes.

The starches, and the weight ratio's of the starches, water, alkali base and sodium borate, and the ratio main paste:carrier paste in the above method of manufacture correspond to the ones defined above for the starch-based glue paste composition according to the invention.

Because the main paste is much more concentrated in starch, is containing much less alkali base calculated on the starch content compared to the carrier (primary) paste, and is prepared at or below room temperature, the starches in the main (secondary) paste do not undergo gellification or undergo gellification to only a non-significant extent, being typically less than 1 wt %.

Furthermore, in the mixture of carrier paste and main paste forming the glue paste composition, the starch of the main paste remains non-gellified or essentially non-gellified (i.e. gellification typically less than 1 wt %), because all or about all of the alkali base used in the preparation of the carrier paste has reacted in that process step, and, as a result of mixing the carrier paste with the main paste, the temperature of the main paste is decreased and the alkalinity of the mixture is reduced by the dilution effect to a pH value too low to cause gellification.

Accordingly, in contrast to the rice starch in the glue compositions described in JP 2001-164213, the rice starch in the glue paste composition of the present invention is non-gellified or at most gellified to a non-significant extent, typically less than 1 wt %.

The selection of the starch or mixture of starches (including the plant source, the type [native or chemically modified starch], and grade of the starch), the starch concentration in the carrier paste and in the main paste, the weight ratio of the starches in the mixtures, and the weight ratio of the starches with the alkali base and with sodium borate can be made on the basis of common knowledge, taking into account i.a. the properties of the selected starch or mixture of starches, the desired viscosity of the paste composition, the viscosity stability of the glue paste composition, and the availability and costs of the starches.

The selection of the weight ratio rice starch:other starch (or mixture of other starches) can easily be made by the skilled person by means of a few routine experiments, on the basis of the properties presented by the glue paste composition, for example having regard to the viscosity and the viscosity stability of the glue paste composition, the rapidity and quality of the initial glueing of the corrugated board to the liner, the heating requirements for obtaining complete glueing together and the quality (strength) of the final connection obtained.

According to a preferred second variant (named herein Variant B), the starch-based glue paste composition of the present invention is manufactured by a one pot preparation process. Hereto, in a first step, the carrier paste is prepared as indicated above. This includes adding under stirring the starch or mixture of starches in powder form to water at about 30° C. to 50° C., and adding the alkali base, typically caustic soda, followed by stirring the mixture under high shear, commonly for about 10 to 40 minutes, till a mixture of completely gellified starch and with a stable viscosity is obtained. Subsequently, in a second step, water at or below room temperature is added under stirring to the mixture obtained in the first step, followed by the addition under stirring of the rice starch and the one or more other selected starches. The starches forming the secondary paste can be added either separately or in the form of a premix which may be in the form of a dry mix or in the form of an aqueous paste. Then sodium borate, typically borax, is added under stirring. The sodium borate can also be added before or during the addition of the rice starch and/or the other starch or starches. The mixture obtained is homogenised by stirring, which typically takes about 10 to 30 minutes, yielding the final glue composition.

The weight ratio's of the components used in the first step (forming the primary paste) and in the second step (forming the secondary paste), and the weight ratio secondary paste: primary paste, correspond to the ones indicated above for the glue paste according to the present invention.

The glue paste composition obtained through the above one pot manufacturing process is also characterised by the presence of starches of two different kinds, namely completely gellified starch resulting from the first step and forming the primary paste, and non-gellified starch resulting from the second step of the process and forming the secondary paste.

Both methods, the method involving separate preparation of the carrier paste and the main paste, followed by the mixture thereof to form the glue paste composition, as well as the one pot manufacturing method, can be carried out according to conventional techniques. The one pot manufacturing method is commonly used at industrial scale. Also an in-line mix process can be used for the manufacture of the glue paste of the invention at semi-industrial or industrial scale.

The premix, in particular the dry premix, composed of a mixture in the above defined appropriate weight ratio of said native rice starch, or acetylated rice starch, and said one or more other starches selected from the above defined group consisting of corn starch, wheat starch, rye starch, oat starch, barley starch, potato starch, tapioca starch and pea starch, each being native starch or chemically modified starch, or any mixture thereof, constituting an intermediate especially composed for the preparation of the secondary paste (according to variant A as well as variant B) for the manufacture of the glue paste composition according to the present invention, also is part of the present invention.

In said premix, the content of the native rice starch or acetylated rice starch may range from 10 to 30 wt %, preferably from 15 to 25 wt %, most preferably from 15 to 19 wt %. The premix can be prepared by conventional methods such as by merely mixing the dry components in the desired weight ratio.

In a third aspect, the present invention relates to a method for the manufacture of laminated corrugated board containing the steps of (i) applying a film of starch-based glue paste composition according to the present invention to the tops of the corrugates at one or both sides of a corrugated board, (ii) bringing a liner into contact with the tops of the corrugated board bearing said starch-based glue paste with application of pressure and heat to initiate gellification and to ensure an initially joining together of the surfaces in contact with the glue composition, and (iii) completing the glueing of the corrugated board to the liner by applying heat to the initially joined surfaces, thereby yielding the desired laminated corrugated board.

The manufacture of the laminated corrugated board can be carried out by conventional techniques and according to conventional conditions regarding pressure, heat and speed, which are well known in the art.

The application of pressure and heat in the step of the initially joining together of the core and liner can, for example, be carried out concurrently when bringing the tops of the corrugated core covered with starch-based glue in contact with the liner, or consecutively (pressure followed by heat). It is also possible to pre-heat the corrugated core and/or the liner material prior to bringing the glue paste to the tops of the corrugates and to bring the core and the liner into contact with each other under pressure.

In a fourth aspect, the present invention relates to laminated corrugated board in which the liner has been joined to the corrugated board by means of a starch-based glue paste composition of the present invention as defined above.

This includes all kinds of laminated corrugated board which can be manufactured by conventional techniques, including the method described above. Said kinds of laminated corrugated board comprise (i) board consisting of one corrugated board core that is laminated on one or on both sides with a liner, (ii) board consisting of one liner joined together on each side to a corrugated board which in turn is lined or not on the outer sides, and (iii) multi-layer board, composed of two or more laminated corrugated board cores, which are joined together by a glue paste composition of the present invention.

It is understood that the glue composition of the present invention can also be used for joining together other surfaces than corrugated board and flat board or paper surfaces. The skilled person can easily determine by means of a few routine tests whether or not the glue composition of the present invention is suitable for adequately joining other selected surfaces.

It has to be noted that, in contrast to JP 2001-164213, the glue composition of the present invention contains rice starch only in the main paste component of the glue composition and that accordingly said rice starch is non-gellified or essentially non-gellified.

This characteristic results in various advantages compared to the compositions of JP 2001-164213, such as a simpler and more economical manufacturing process. Native rice starch is known to require a longer time to become fully gellified than corn, wheat, potato or tapioca starch. Indeed, it takes about 30 minutes stirring under the conditions for the preparation of a carrier paste to transform native rice starch into its gellified form. Furthermore, native rice starch is more expensive than corn, wheat, potato or tapioca starch. Accordingly, since no rice starch is used in the preparation of the carrier paste for the glue paste according to the present invention, this results, compared to the manufacture of the glue compositions according to JP 2001-164213, in considerable time savings for the manufacture at industrial scale of the carrier paste, as well as in cost savings, including savings in raw materials costs as well as in manufacturing costs.

The present invention is illustrated by the examples described below. The compositions herein are indicated in wt % unless where otherwise stated.

EXAMPLE 1

According to the Stein-Hall method (Variant B described above) a glue paste composition of the present invention was prepared at laboratory scale with the following characteristics:

a carrier paste was prepared on the basis of native corn starch and the temperature of the mixture in the primary phase (first step of the one pot manufacture process) was limited to 40° C. in order to avoid in the second step gellification of the starches added to form the secondary paste (and concurrent undesirable viscosity increase of the glue paste).

Composition and manufacture of the glue paste:
1.st step:
water: 344 g (warmed up at 40° C.)
native corn starch: 32 g
caustic soda*: 6.01 g (dry substance at 100% NaOH)
(*added at once under stirring as 12.02 g aqueous solution at 50 wt %) agitation with high shear for 10 minutes.
2.nd step: to the mixture obtained in the first step is added:
water: 663 g (at room temperature)
dry pre-mix of starches: 308 g
(* premix: composed of 80 wt % native corn starch and of 20 wt % native rice starch containing 16–18 wt % amylose and 83–81 wt % amylopectin (Remy. CB) (Brand name of Remy Industries n.v., Belgium), which corresponds to a rice starch content of 17.2 wt % on the final glue (dry substance.)
borax decahydrate: 4.29 g
agitation for 10 minutes.
The weight ratio main paste: carrier paste is 2.5:1.

The obtained glue paste composition presents a very good structure and very good film forming properties. The structure is shorter that the one of a comparable glue paste prepared from only native corn starch. Such short structure is advantageous because it prevents splashing of the glue paste when it is applied, particularly at high speed, onto the tops of the corrugates of corrugated board. The glue paste forms a smooth film which ensures a good pick up of the glue paste by the surfaces to be joined. The paste shows also a good water retention which is desirable to prevent superficial glueing of the surfaces to be joined. Besides, the glue paste presents good glueing properties (high glueing strength) in combination with a high glueing speed.

Glueing speeds were determined on laboratory scale by a standardised procedure as follows:
strips (40×150 mm) of regular copy paper (80 g/m$^2$) were prepared and, using spacers, a glue film of approximately 200 micrometer thickness was applied on a paper strip;
the strip was laid down (glue face down) on a full page of the same paper quality laying on a flat and thermally insulating surface, and covered by another such paper (to prevent glueing to the heating device);
a heating device (with a flat, electrically heated metallic surface, thermostatically controlled) at 80° C. was pressed by hand on the top paper during a pre-set time period;
immediately after removing of the heating device, a (standard) tearing off test is made. When the glue is still not binding, the test is repeated with a longer heating time (heating time increased by one or two seconds). When the glue is binding, the test is repeated with a shorter heating time (heating time reduced by one or two seconds). In this manner, by moving to longer/shorter heating times, the critical heating time is determined, being the minimum heating time required to obtain complete glueing together (and which accordingly is also named critical bonding time). The critical heating time is typically a few seconds, which corresponds to the heating time applied in an industrial installation.

The typical accuracy of this standardised procedure is 1 to 2 seconds, depending on the total time (1 second for binding times below 3 seconds, and 2 seconds for binding times above 3 seconds).

Following the same procedure as described above in Example 1, several glue paste compositions consisting of various combinations of primary and secondary starch pastes were prepared and their critical heating times were determined. The results are indicated in table 1 below.

TABLE 1

| Primary starch paste | Secondary starch paste # | Critical heating time (second) |
|---|---|---|
| native corn | native corn* | 6 |
| native corn | 82% native corn + 18% native rice (18% amylose) | 1 |
| native wheat | 82% native wheat + 18% native rice (18% amylose) | 1 |
| cross-linked wheat | 82% cross-linked wheat + 18% native rice (18% amylose) | 1 |
| cross-linked wheat | cross-linked wheat* | 5 |
| native corn | 82% native corn + 18% native wheat* | 4 |
| native corn | 82% native corn + 18% native rice (22% amylose)* | 6 |

TABLE 1-continued

| Primary starch paste | Secondary starch paste # | Critical heating time (second) |
|---|---|---|
| native corn | 82% native corn + 18% native rice (2% amylose)* | 4 |
| native corn | 82% native corn + 18% cross-linked rice (22% amylose)* | 4 |
| native corn | 82% native corn + 18% cross-linked rice (18% amylose)* | 6 |
| native corn | 82% native corn + 18% cross-linked rice (2% amylose)* | 6 | weight ratio main paste:carrier paste 2.5:1.
*comparative

These results of the glueing tests clearly show that the glue paste compositions according to the invention present a strong glueing power in combination with a high glueing speed, a combination of properties which is of high technical and economical interest.

EXAMPLE 2

Following the same procedure as described above in Example 1, several glue paste compositions consisting of various combinations of primary and secondary starch pastes were prepared at laboratory scale in order to determine their thickening speed.

When starch-based glue compositions are heated, their viscosity increases as a result of the swelling of the non-gellified starch particles of the secondary paste and at the beginning of the glueing process, the increase in viscosity of the glue paste composition rises sharply. Accordingly, the rate of increase of viscosity of the glue composition, expressed as thickening speed, is a good indication for the beginning of the glueing together (bonding) process. The higher the thickening speed value, the better the glueing process.

The measurement of the thickening speed is carried out on freshly prepared glue paste compositions as follows:
  swelling tests are carried out to determine the temperature of minimum viscosity of the glue composition (this is the temperature where the swelling is just not yet taking place). When this temperature is lower than 50° C., the caustic soda dosage is lowered slightly, and the test is re-run until the temperature of 50° C. for the minimum viscosity is reached. Similarly, when the temperature at minimum viscosity is higher than 50° C., the caustic dosage is increased slightly and the test is re-run until the temperature of 50° C. for the minimum viscosity is reached. The purpose of the procedure is to standardise all test compositions to the same swelling temperature.
  the swelling test is carried out in a rheometer (Physica DSR 4000, Anton Paar), with a plate-plate geometry, 50 mm diameter and 1 mm spaced. By means of a heating element (Peltier heating element), the heating speed was set at a rate of 1° C. per 8 seconds (higher heating speeds, up to 1° C. per 2 seconds, were also tried out, with substantially equivalent but less precise results). Viscosity was monitored during the heating process (from 35° C. to 65° C.) by rotation rheology (a high shear of 1000/s was used to ensure a fast heat transfer).
  from the viscosity and temperature measurements, a thickening speed was calculated as a percent viscosity increase per ° C. temperature increase, which is considered to be a good index of thickening speed. The evolution of these parameters for a specific glue paste composition can be graphically represented in a thickening rheogram, as exemplified in FIG. 1. From these data the maximum thickening speed can be derived which is a good index of the speed at which the glueing process occurs. The higher the maximum thickening speed value, the faster the glueing together occurs, and the faster the glueing occurs, the better for the manufacture of laminated corrugated board at industrial scale.

The maximum thickening speed obtained for various glue paste compositions is indicated in table 2 below.

FIG. 1 (FIG. 1) is presenting a thickening rheogram of a typical glue paste composition according to the present invention, prepared according to the procedure of Example 1, consisting of a primary paste composed of native wheat starch and a secondary paste composed of 82% native wheat starch and 18% native rice starch (18% amylose), with a weight ratio secondary paste: primary paste of 2.5:1.

TABLE 2

| Primary starch paste | Secondary starch paste # | Maximum thickening speed (%/° C.) |
|---|---|---|
| native corn | 82% native corn + 18% native rice (18% amylose) | 91 |
| native wheat | 82% native wheat + 18% native rice (18% amylose) | 172 |
| native corn | 82% native corn + 18% native wheat* | 25 |
| native corn | 82% native corn + 18% native rice (22% amylose)* | 10 |
| native corn | 82% native corn + 18% native rice (2% amylose)* | 31 |
| native corn | 82% native corn + 18% cross-linked rice (22% amylose)* | 18 |
| native corn | 82% native corn + 18% cross-linked rice (18% amylose)* | 15 |
| native corn | 82% native corn + 18% cross-linked rice (2% amylose)* | 15 | weight ratio main paste:carrier paste 2.5:1.
*comparative

The results presented in table 2 dearly show the unexpectedly high maximum thickening speed of the glue paste compositions of the present invention compared to glue paste compositions prepared from a secondary starch paste without the particular native rice starch which is characteristic for the glue compositions according to the present invention.

EXAMPLE 3

A glue paste composition according to the present invention was prepared at industrial scale according to the Stein-Hall method (Variant B above) with the following characteristics:
Composition and manufacture of the glue paste:
  step 1:
  water: 850 kg (warmed up at 30° C.)
  starch: 60 kg cross-linked wheat starch*. (Mylbond 210; Brand name of Amylum, Belgium)* standard quality of cross-linked wheat starch commonly used in glue pastes for laminated corrugated board
  alkali base: 33 kg caustic soda at 29 wt %; (added rapidly under stirring), agitation with high shear for 15 minutes step 2: to the mixture obtained in the first step are added under stirring:
water: 950 kg at about 20° C.
dry mix of starches composed of 490 kg wheat starch Mylbond 210 (Brand name of Amylum, Belgium) and 100 kg native rice starch containing 16–18 wt % amylose and 83–81 wt % amylopectin (REMY CB) (Brandname of Remy Industries, Belgium); corresponding to a rice starch content of 15,38 wt % on the final glue (dry substance)
borax decahydrate: 4.2 kg
agitation for 15 minutes.

Characteristics of the glue paste:
weight ratio main paste: carrier paste: 1.64:1
starch: 26.1 wt % on total paste
viscosity: 46 sec. Bauer at 32° C.

The glue paste obtained presents:
a very short glue structure which reduces significantly splashes of glue during the application of the glue for the manufacture of laminated corrugated board at high speed. Compared to a glue paste prepared only from cross-linked wheat starch, e.g. Mylbond 210 (Trade name), which presents already a shorter glue structure than glue prepared from native wheat starch, the glue paste of the invention presents an even shorter glue structure. This results in significant improvements, including the possibility to apply a more homogeneous glue film of less thickness and at a higher speed than with conventional glue pastes;
excellent viscosity stability, which enables easily processing of the paste and which prevents considerable variations in the amount of glue paste applied, thus enabling the application at high speed of a thin and homogeneous film of glue paste on the tops of the corrugates;
excellent water retention, which is required to obtain a good hydration of the starch which in turn results in good initial glueing together (so-called green bond) of the concerned surfaces;
excellent film-forming properties enabling the forming of a very smooth glue film on the glue applicator rolls.

EXAMPLE 4

Using the glue paste obtained in Example 3, laminated corrugated board was made in a test run on the double backer part of a corrugated board installation using light paper for the liners (liner paper weights: respectively 140–120 g/m² and 110 g/m²). During the test run the thickness of the glue film was progressively reduced from 0.22 mm over 0.16 mm to 0.12 mm. Subsequently, at a film thickness of 0.12 mm, the manufacturing speed was progressively increased from 250 m/min to 280 m/min (being the maximum speed allowed by the apparatus) and the heating was reduced from steam pressure 8 bar to 6.5 bar. The parameters have been optimised on the basis of the indications obtained by the tearing off test about the initial and complete glueing together of the corrugated core and the liner.

The results obtained show:
an excellent joining together of the surfaces even when applying minimal amounts of glue paste film, indicating a stronger initial glueing strength (green bond) compared to a glue paste prepared solely from wheat starch;
an excellent setting of the glue during the heating step which allows to produce laminated corrugated board at higher speed than with conventional glue paste compositions and this at lower heating rates (lower steam pressure applied to the heating section);
an excellent film forming of the glue paste which allows the application of a homogeneous glue film and of a minimal amount of glue paste; this in turn results in a strong reduction of deformations of the liner compared to known glue compositions, which accordingly provides improved printability and quality of the printing on the liners;
an excellent quality of laminated corrugated board (double backed) prepared at the most demanding conditions (thinnest glue film; highest manufacturing speed of the laminated corrugated board, and lowest heating to initiate and to complete the glueing together), as shown by a tearing off test.

EXAMPLE 5

With a glue paste composition prepared according to Example 3, a test run was made at industrial scale for the manufacture of laminated corrugated board with heavy paper liners. Liners of 185 g/m² to 400 g/m² were used. The initial viscosity of the glue paste was 53 sec. Bauer at 31° C. During the test run, the thickness of the glue film (directly linked to the amount of glue paste applied) was progressively reduced. Subsequently, the manufacturing speed was progressively increased from 185 m/min to 200 m/min and the heating was reduced from steam pressure 8 bar to 6.5 bar. Complete glueing was obtained under all these conditions.

The results obtained showed that laminated corrugated board of excellent quality can be prepared with the glue paste of the present invention and this with at least the same speed of production as laminated corrugated board made with conventional starch-based glue compositions.

The results furthermore showed that the glue paste of the present invention ensured an excellent initial glueing of the core and liner. Besides, an unexpectedly high reduction in thickness of the glue film required to ensure good joining together of the corrugated board and the liners has been possible with the glue paste of the invention compared to conventional starch-based glue compositions. Test runs indeed indicated that with kraft liners of 400 g/m², a film of 0.12 mm thickness of glue of the present invention provided at least as good glueing results as a film of 0.20 mm of a conventional starch-based glue composition, which represents a reduction of about 40%.

EXAMPLE 6

With a glue paste composition prepared according to Example 3, a test run was made for the manufacture of double backed laminated micro-corrugated board.

The initial glue paste viscosity was 45 sec. Bauer at 36° C. The film forming properties of the glue paste on the glue applicator roll were very good. This enabled the formation of an homogeneous film without lumps of small gellified particles which would disturb the application of a homogeneous film on the surface to be glued. Although the glue paste of the invention is containing in total less starch than conventional glue pastes, its glueing properties were excellent, even with a glue film thickness of 0.08 mm, whereas with known starch-based glue compositions usually a film thickness of about 0.16 mm is required. Furthermore, said good results were obtained with a lower temperature (lower steam pressure) in the heating section (final heating step) compared to conventional glues, which results in less deformation of the liners and thus in an improved quality of the laminated corrugated board. The glue composition of the invention provides complete glueing together of the corrugated board and the liners with bonding times, upon heating, of 1 to 2 seconds, compared to about 6 seconds for a glue composition based only on corn starch.

As results from the examples and tests made, the glue paste compositions of the invention present excellent film forming properties. They have a very short structure which prevents splashing and enables the application at high speed of a homogeneous and thin film of the glue paste on the surfaces to be joined together, which in turn ensures excellent quality of the end product. The glue compositions also present a good viscosity stability. This stability avoids undesirable fluctuations in glue application, which is also favourable for the application at high speed of a homogeneous and thin film of the glue paste. The glue compositions furthermore present a very good water retention which prevents that too much water of the paste enters the paper or board, thus keeping the water available for starch swelling in the glueing steps, which ultimately improves the quality of the glued end product.

The glue paste compositions of the invention present, furthermore, excellent glueing properties, enabling to join together paper and board surfaces rapidly and with high glueing strength, thus enabling the manufacture of high quality laminated corrugated board in an industrially interesting manner. In comparison with conventional starch-based glue compositions, the glue compositions of the invention present increased bonding speed, even at about 2% lower dry substance content, while ensuring excellent glueing together of paper and corrugated board, thus enabling a higher production rate of laminated corrugated board.

The combination of the good film forming properties and the good glueing properties of the glue paste compositions of the invention, ensures rapid and good glueing together of the concerned surfaces, even at a significantly reduced thickness of the glue film compared to conventional starch-based glue pastes. The glue compositions of the invention ensure excellent glueing together of various qualities of paper and corrugated board at a film thickness reduction of 30 to 50% compared to known starch-based glue pastes.

This combination of desirable properties thus results in an unexpectedly significant reduction of the amount of glue paste that is needed to obtain at least the same glueing strength as the one obtained with conventional amounts of known starch-based glue paste compositions, i.e. typically 4 to 7 g/m² of glue paste composition of the invention versus commonly 8 to 10 g/m² of conventional starch-based glue paste. The reduction in the amount of glue paste composition of the invention that is needed to obtain excellent joining together of corrugated board and liner(s), ranges from 30% to 50% and even more, typically from 40 to 50%, compared to the amount of glue paste needed of conventional starch-based glue compositions. Besides, said reduction can be realised without negatively affecting the quality and speed of manufacturing of the laminated corrugated board.

Whereas the glue paste composition composed of corn starch and rice starch according to JP 2001-164213 enables a reduction of the required amount of glue paste of 20% compared to conventional glue compositions made only from corn starch, the glue paste composition of the present invention enables a reduction of 30% to 50% compared to conventional starch-based glues, which is a 50% to 150% higher reduction than the one enabled for by the JP 2001-164213 composition.

Furthermore, the significant reduction in amount of the glue paste of the present invention needed to obtain good glue strength and the fact that the total starch content in the glue paste compositions of the present invention is commonly lower than the one of conventional starch-based glue paste compositions, results in various advantages over known starch-based glue paste compositions. A particular advantage resulting from said reduced amount of glue paste needed to obtain excellent glueing together of corrugated board and liners, is that also less water is applied to the surfaces to be glued. Accordingly, less heat is required for performing the glueing together, which results in considerable energy savings. A further advantage of said reduction in the amount of water applied to the surfaces to be glued is a significant reduction in deformation of the core and particularly of the paper or board material of the liners resulting from water absorption, including deformations such as warping and board deformation. This improves the quality of the glued end product which in turn results in an improved printability of the glued articles and in an improved quality of the printing.

As a further advantage resulting thereof, while still ensuring high quality laminated corrugated board, the speed of manufacturing laminated corrugated board can be significantly increased, compared to the manufacture of laminated corrugated board by means of conventional starch-based glue compositions.

Furthermore, said advantages significantly reduce the costs for glue paste and for its manufacture, the costs of heating required to glue together the core material and liner(s), and thus the overall costs for the manufacturing of the laminated corrugated board.

Still further advantages of the glue paste compositions of the present invention include the absence of toxic and poorly biodegradable components, as well as the amply availability at interesting costs of the starches.

Still further advantages include that less corrugated board waste is produced during switches in product and switches in product quality on the corrugating board manufacturing machine. This results from the excellent film forming and glueing performances of the rice starch containing glue paste compositions of the invention which makes that these performances are less dependent from the cooling of the dryer during the switches, compared to known glue paste compositions. The corrugated board waste savings are about 1% to 2% which represents a significant amount.

What is claimed is:

1. Starch-based glue paste composition comprising a mixture of a carrier paste and a main paste, wherein:
the carrier paste is a starch-based paste composed of a starch selected from the group consisting of corn starch, wheat starch, rye starch, oat starch, barley starch, potato starch, tapioca starch and pea starch, each being native starch or chemically modified starch, or any mixture thereof, water and an alkali base, wherein the starch is present in a concentration ranging from 5 to 16 wt % based on the total amount of water in the carrier paste, and the alkali base is present in an amount ranging from 10 to 25 wt %, calculated as sodium hydroxide and based on the amount (dry substance) of the starch in the carrier paste;
the main paste is a starch-based paste composed of a mixture of (i) native rice starch which contains from 12 to 20 wt % amylose, about 1 wt % other compounds, and a complementary 87 wt % to 79 wt % amylopectin, or an acetylated version of the native rice starch containing from 0.25 to 2.5 wt % acetyl groups on dry starch content, and (ii) a starch selected from the group consisting of corn starch, wheat starch, rye starch, oat starch, barley starch, potato starch, tapioca starch and pea starch, each being native starch or chemically modified starch, or any mixture thereof, water, and sodium borate, wherein the native rice starch or acetylated version thereof is present in an amount ranging from 10 to 30 wt % on the total starch content (dry substance) of the main paste, the total amount of starches in the main paste ranges from 25 to 50 wt %, based on the total amount of the main paste, and sodium borate (calculated as anhydrous borax) is present in an amount ranging from 0.3 to 3 wt % based on the amount of the starch (dry substance) in the main paste; and the weight ratio main paste carrier paste ranges from 1:1 to 3:1.

2. Laminated corrugated board wherein a liner has been joined to the tops of the corrugates of the corrugated board by means of a starch-based glue paste composition as defined in claim 1.

3. Glue paste composition according to claim 1, wherein the starch in the carrier paste and in the main paste, apart from the rice starch, is native or cross-linked wheat starch.

4. Laminated corrugated board wherein a liner has been joined to the tops of the corrugates of the corrugated board by means of a starch-based glue paste composition as defined in claim 3.

5. Glue paste composition according to claim 1, wherein the starch in the carrier paste and in the main paste, apart from the rice starch, is native or cross-linked corn starch.

6. Laminated corrugated board wherein a liner has been joined to the tops of the corrugates of the corrugated board by means of a starch-based glue paste composition as defined in claim 5.

7. Glue paste composition according to claim 1, wherein the rice starch is native rice starch or an acetylated version thereof, containing from 16 to 18 wt % amylose, about 1 wt % other compounds and a complementary 83 to 81 wt % amylopectin.

8. Laminated corrugated board wherein a liner has been joined to the tops of the corrugates of the corrugated board by means of a starch-based glue paste composition as defined in claim 7.

9. Glue paste composition according to claim 1, wherein the rice starch or acetylated rice starch is present in the main paste in an amount of 15 to 25 wt %.

10. Laminated corrugated board wherein a liner has been joined to the tops of the corrugates of the corrugated board by means of a starch-based glue paste composition as defined in claim 9.

11. Glue paste composition according to claim 1, wherein the alkali base in the carrier paste is sodium hydroxide and the sodium borate in the main paste is borax.

12. Laminated corrugated board wherein a liner has been joined to the tops of the corrugates of the corrugated board by means of a starch-based glue paste composition as defined in claim 11.

13. Glue paste composition according to claim 1, wherein the weight ratio main paste: carrier paste ranges from 1.4:1 to 2:1.

14. Laminated corrugated board wherein a liner has been joined to the tops of the corrugates of the corrugated board by means of a starch-based glue paste composition as defined in claim 13.

15. Method for the manufacture of a glue paste composition as defined in claim 1, comprising the steps of:

preparing a carrier starch-based paste by mixing under stirring into water at 30° C. to 50° C., a starch selected from the group consisting of corn starch, wheat starch, rye starch, oat starch, barley starch, potato starch, tapioca starch and pea starch, each being native starch or chemically modified starch, or any mixture thereof, water and an alkali base, in a concentration ranging from 5 to 16 wt % based on the total amount of water in the carrier paste, and the alkali base in an amount ranging from 10 to 25 wt %, calculated as sodium hydroxide and based on the amount (dry substance) of the starch in the carrier paste, followed by stirring with shearing of the mixture at 30° C. to 50° C. until the starch is completely gellified and a stable viscosity of the mixture is obtained;

preparing a main starch-based paste by mixing under stirring, into water at or below room temperature, native rice starch which contains from 12 to 20 wt % amylose, about 1 wt % other compounds, and a complementary 87 wt % to 79 wt % amylopectin, or an acetylated version of the native rice starch containing from 0.25 to 2.5 wt % acetyl groups on dry starch content, and a starch selected from the group consisting of corn starch, wheat starch, rye starch, oat starch, barley starch, potato starch, tapioca starch and pea starch, each being native starch or chemically modified starch, or any mixture thereof, water and sodium borate, the rice starch or acetylated rice starch being present in 10 to 30 wt % on total starch content (dry substance) of the main paste, and the total amount of starch in the main paste being from 25 to 50 wt % based on the total amount of the main paste, and sodium borate (calculated as anhydrous borax) being in an amount ranging from 0.3 to 3 wt % based on the amount of the starch (dry substance) in the main paste, followed by stirring for 5 to 10 minutes to yield a homogeneous paste; and mixing the carrier paste and the main paste in a weight ratio main paste:carrier paste ranging from 1:1 to 3:1.

16. Method according to claim 15, wherein the carrier paste and the main paste are prepared separately and subsequently mixed.

17. Method according to claim 15, wherein the glue paste composition is prepared by a one pot process wherein first the carrier paste is prepared as defined in claim 8, and subsequently water, the native rice starch or the acetylated version thereof, and a starch selected from the group consisting of corn starch, wheat starch, rye starch, oat starch, barley starch, potato starch, tapioca starch and pea starch, each being native starch or chemically modified starch, or any mixture thereof, and sodium borate, are added to said carrier paste under stirring at or below room temperature in an amount corresponding to the one for the preparation of the main paste as defined in claim 8 and in a weight ratio main paste: carrier paste ranging from 1:1 to 3:1.

18. Method for the manufacture of laminated corrugated board comprising of the steps of:

(i) applying a film of starch-based glue paste composition as defined in claim 1 to the tops of the corrugates at one or both sides of a corrugated board core;

(ii) bringing a liner into contact with the tops of the corrugated board core bearing said starch-based glue paste with application of pressure and heat, initiating gellification and an initial joining together of the surfaces in contact with the glue composition; and (iii) completing the glueing of the corrugated board core to the liner(s) by the application of heat.

19. Method according to claim 18, wherein a film of starch-based glue paste composition as defined in claim 1 is applied to the tops of the corrugates of the corrugated board core in an amount ranging from 4 to 7 $g/m^2$.

* * * * *

UNITED STATES PATENT AND TRADEMARK OFFICE
CERTIFICATE OF CORRECTION

PATENT NO.   : 6,964,703 B2
DATED        : November 15, 2005
INVENTOR(S)  : Geeroms It is certified that error appears in the above-identified patent and that said Letters Patent is hereby corrected as shown below:

<u>Column 18,</u>
Line 48, "claim 8" should be -- claim 15 --.

Signed and Sealed this

Twenty-first Day of March, 2006

JON W. DUDAS
*Director of the United States Patent and Trademark Office*

UNITED STATES PATENT AND TRADEMARK OFFICE
CERTIFICATE OF CORRECTION

PATENT NO.       : 6,964,703 B2                                    Page 1 of 1
APPLICATION NO. : 10/507036
DATED            : November 15, 2005
INVENTOR(S)     : Geeroms It is certified that error appears in the above-identified patent and that said Letters Patent is hereby corrected as shown below:

Claim 17, Column 18, Line 39, "claim 8" should be -- claim 15 --.

Signed and Sealed this

Fourteenth Day of October, 2008

JON W. DUDAS
*Director of the United States Patent and Trademark Office*